United States Patent [19]
Rossi

[11] 3,986,788
[45] Oct. 19, 1976

[54] PRIME MOVER SPEED CONTROL SYSTEM

[75] Inventor: Anthony J. Rossi, Leominster, Mass.

[73] Assignee: General Electric Company, Schenectady, N.Y.

[22] Filed: Nov. 25, 1974

[21] Appl. No.: 526,906

[52] U.S. Cl. .............................. 415/10; 290/40 A; 318/608; 415/30
[51] Int. Cl.² ........................................ F01B 25/06
[58] Field of Search .............. 290/40 A; 415/15, 17, 415/10; 318/608

[56] References Cited
UNITED STATES PATENTS

| | | | |
|---|---|---|---|
| 3,462,663 | 8/1969 | Schiller | 318/608 X |
| 3,753,067 | 8/1973 | Milligan | 318/341 X |
| 3,798,907 | 3/1974 | Barrett et al. | 415/30 X |

*Primary Examiner*—Arnold Rosenthal
*Attorney, Agent, or Firm*—James W. Mitchell; John F. Ahern

[57] ABSTRACT

A speed control system for a fluid driven prime mover, for example, a turbine wherein the speed of the prime mover is controlled by the positioning of at least one fluid inlet valve. The inlet valve is positioned by a valve operator responsive to an output voltage from the speed control system. The output voltage is directly proportional to the phase difference (error) between a variable reference digital pulse train input representing a desired speed and a feedback digital pulse train input representing the actual prime mover speed. During steady-state operation, prime mover load changes will first cause a phase difference between the reference input and the feedback input whereupon a corrective output voltage is immediately applied to the inlet valve operator prior to the occurrence of an actual speed error. Similarly, desired speed changes are set in the variable reference input resulting in immediate and precise valve operator response since the accompanying change in phase between the new reference input and the last feedback input results in an immediate corrective output voltage.

8 Claims, 10 Drawing Figures

$$f_{OUT} = 10kHZ \left(\frac{E_{IN}}{10V}\right)$$

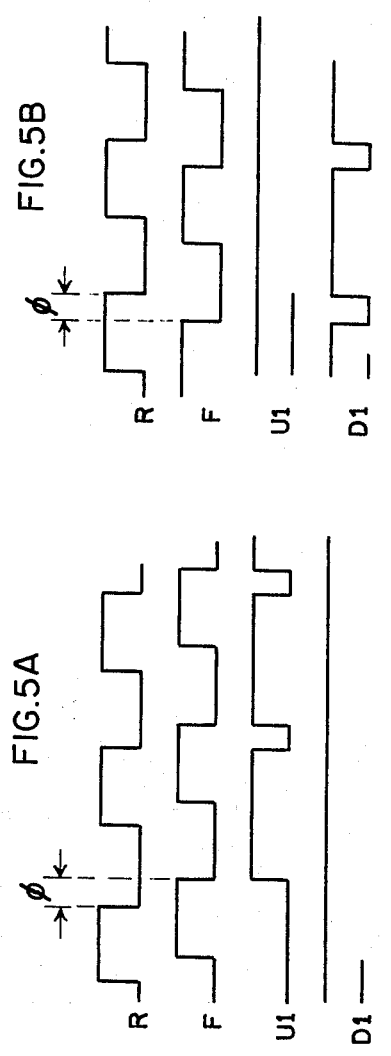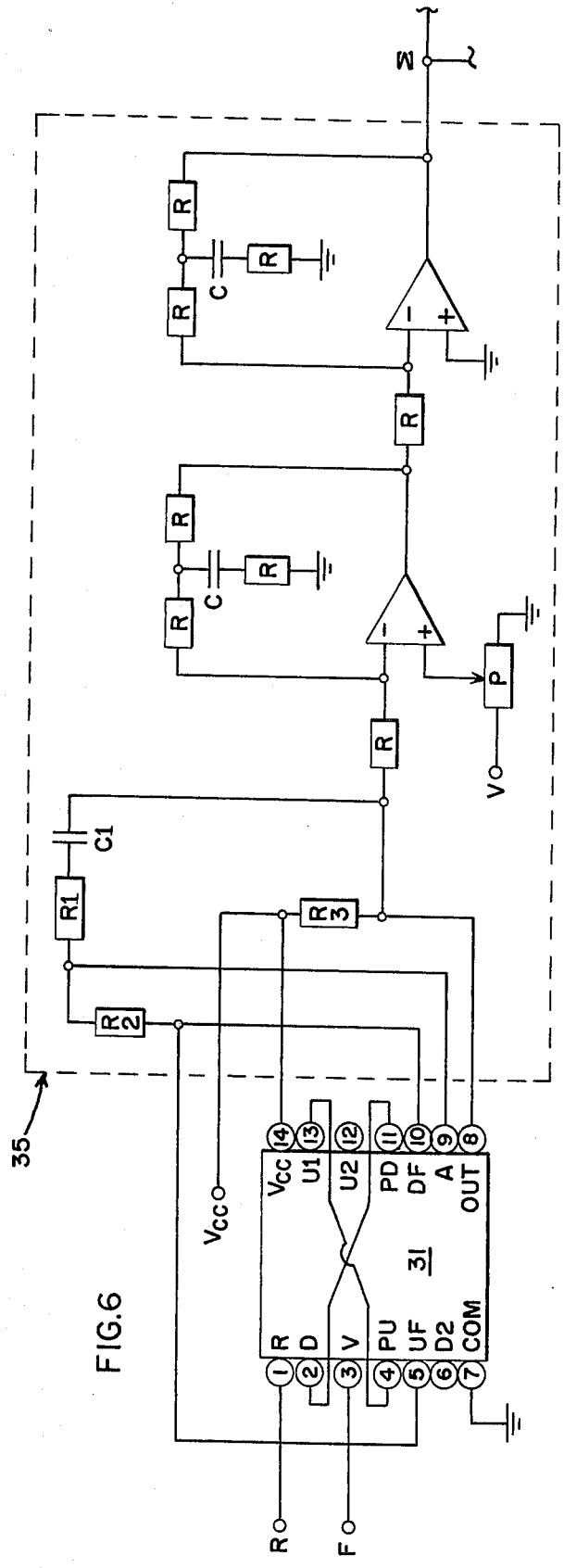
FIG.5A
FIG.5B
FIG.5C
FIG.6

PRIME MOVER SPEED CONTROL SYSTEM

BACKGROUND OF THE INVENTION

This invention relates, in general, to speed control systems for fluid driven prime movers; and, in particular, the present invention is directed to a prime mover speed control system based on a phase comparison between a variable reference input and feedback input during both a speed change and steady-state mode of operation.

Electro-hydraulic speed control systems for prime movers comprise an electronic comparator device for comparing an input reference signal, representing a desired prime mover speed, with a feedback signal, representing the actual prime mover speed, to obtain a speed error signal which is then applied to a valve operator which controls a prime mover inlet valve. The signals may either be analog signals having a voltage level proportional to speed or digital pulse trains having a frequency proportional to speed. One example of an analog electro-hydraulic prime mover control is formed in U.S. Pat. No. 3,097,488 issued July 16, 1963 to Eggenberger et al. In that patent, FIG. 9, taken in conjunction with the specification shows a reference speed signal having a voltage level proportional to a desired set speed being compared with a feedback speed signal having a voltage level proportional to actual prime mover speed to provide an error signal voltage. If the prime mover is operating at the reference speed, no speed error voltage will be generated. If the prime mover is operating at other than the reference speed an error voltage will be generated for actuating the valve operator. The initiation of valve actuation for speed error correction is dependent upon the occurrence of an actual speed error.

An example of a digital prime mover control is U.S. Pat. No. 3,798,907 to Barrett and Ahlgren issued Mar. 26, 1974. In that patent, a reference speed signal and a feedback speed signal are digital pulse trains each having a period which is inversely proportional to its frequency. The respective speed signals are input into a "comparator-integrator" which includes "period measuring logic," "error detection" by subtracting the reference period from the feedback period, "multiplication" and "accumulation." The patented control system is therefore based on an inverse frequency comparison or period comparison of digital signals and hence depends upon an actual speed error (frequency difference) between the reference signal and the feedback signal to provide for corrective valve actuation.

In U.S. Pat. No. 3,753,067 to Milligan a constant speed electric motor is regulated by a system in which either a direct drive signal or a digitally incremented biasing signal is applied to the motor to bring it up to speed or to maintain the motor speed under load. The object of the patented invention is to provide an electronic switching device which will maintain the constant speed motor at rated speed during incremental load changes by applying a relatively narrow bias voltage level rather than the full zero to maximum voltage range of the direct drive signal. In the implementation of this invention, a phase frequency comparator is used to compare a fixed reference speed digital pulse train with a motor speed feedback digital pulse train to provide a pulse signal output which increments the bias voltage level whenever the feedback signal lags the reference signal with respect to phase. Otherwise, the comparator output is zero. Hence, the patent describes a means for maintaining the steady-state speed of an electric motor once a reference frequency and the feedback frequency are synchronized by a direct drive signal.

It is one object of the present invention to provide a speed control system for a fluid driven prime mover which provides inlet valve adjustment proir to the occurrence of actual steady-state speed error.

It is another object of the present invention to provide a highly responsive speed control system for a prime mover adjustable over the full range of desired prime mover speeds.

The invention to be set forth in detail is a speed control system for use in combination with a fluid driven prime mover, such as a steam turbine, wherein the speed of the turbine is controlled by means of steam inlet valves. The steam inlet valves are hydraulically positioned against a spring biased closing force by means of a valve operator, for example, a servo valve. The servo valve is positioned by an output voltage from a phase-frequency detector. The phase-frequency detector receives two input signals both in the form of digital pulse trains. One input signal is a variable reference speed signal having a frequency proportional to the desired speed of the turbine. The other input signal is a feedback signal from the turbine itself having a frequency proportional to the actual turbine speed. The phase-frequency detector compares the two input signals and provides an output voltage which is linearly proportional to the phase difference between the reference speed pulses and the feedback speed pulses. The phase-frequency detector output also indicates whether the phase difference is a lead or lag and hence, whether the inlet valve should be moved to a more open or more closed position. Since an error voltage may be produced when the input phase relation changes, the turbine inlet valve may be adjusted prior to the occurrence of an actual steady-state speed error. Moreover, this variably adjustable speed control is highly responsive since during set speed changes an output signal immediately follows reference input signal change according to the phase change.

The novel features believed characteristic of the present invention are set forth in the appended claims. The invention itself, however, together with further objects and advantages thereof, may best be understood with reference to the following description, taken in connection with the drawings.

BRIEF DESCRIPTION OF THE DRAWINGS

FIGS. 5A and 5B are timing diagrams for the phase-frequency detector;

FIG. 5C is a transfer function diagram for the phase-frequency detector; and,

FIG. 6 is a schematic drawing showing the phase-frequency detector and summing junction interconnected by a stabilizing circuit.

DETAILED DESCRIPTION OF THE INVENTION

Figure 1:
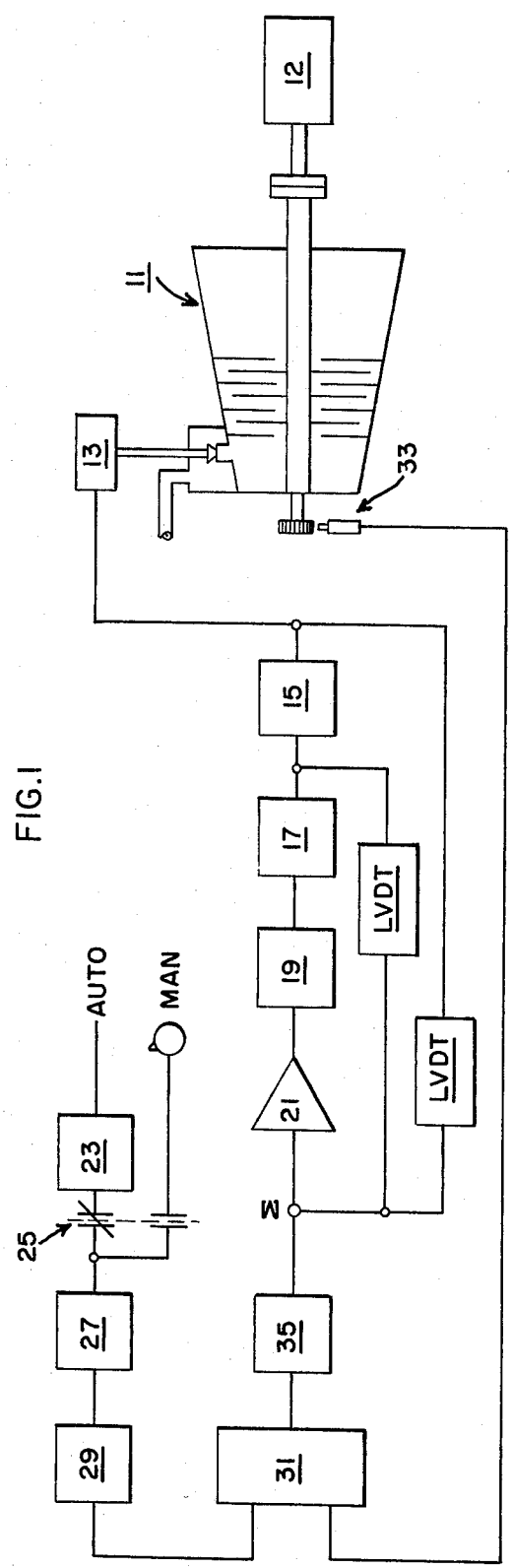
FIG. 1 is a block diagram of the speed control system according to the present invention in combination with a fluid driven prime mover.

FIG. 1 is a block diagram of the invention including a fluid driven prime mover such as a steam turbine 11 which drives a load 12. An inlet valve means comprises an inlet valve 13 for admitting steam to the turbine casing. The inlet valve means may further include a valve operator 15, a hydraulic amplifier 17, a servo valve 19 and an electrical signal amplifier 21. The foregoing elements are all well known in the steam turbine art as shown in U.S. Pat. No. 3,097,488 to Eggenberger et al. issued July 16, 1963.

A variable reference speed signal may be provided automatically through a signal converter 23, the output of which is a positive d-c voltage in a range electronically compatible with the speed control system components and proportional to the automatic reference speed input. Switching means 25 are provided for switching from automatic input to manual input and vice-versa. A high-speed stop 27, limits the maximum voltage which may be applied as the speed reference signal. Voltage to frequency converter 29 converts the input reference speed d-c voltage into a digital pulse train output having a frequency which is linearly proportional to the input reference speed voltage level. The variable reference speed signal, thus conditioned, is a first signal input into a phase-frequency detector 31.

A second input into the phase-frequency detector 31 indicates the actual turbine speed and is a feedback signal from the turbine rotor shaft. The feedback speed signal is a digital pulse train having a frequency proportional to the actual turbine speed. The feedback signal may be obtained, for example, by a transducer 33 positioned adjacent a toothed wheel attached to the turbine rotor shaft.

The phase-frequency detector 31, receives the reference speed signal and the feedback speed signal and compares the two signals with respect to phase, i.e., the relative positions of high-low transitions to provide a phase difference or phase error signal output in terms of a positive d-c voltage level output. Thereafter the detector output signal is input into an amplifier-stabilizer circuit 35, the output of which is input into a summing junction $\Sigma$. At the summing junction, the input voltage indicative of phase error (a valve position correction signal) is combined with feedback voltages indicating the positions of the valve operator and hydraulic amplifier to provide either a valve position hold or a valve position change.

Figure 2:
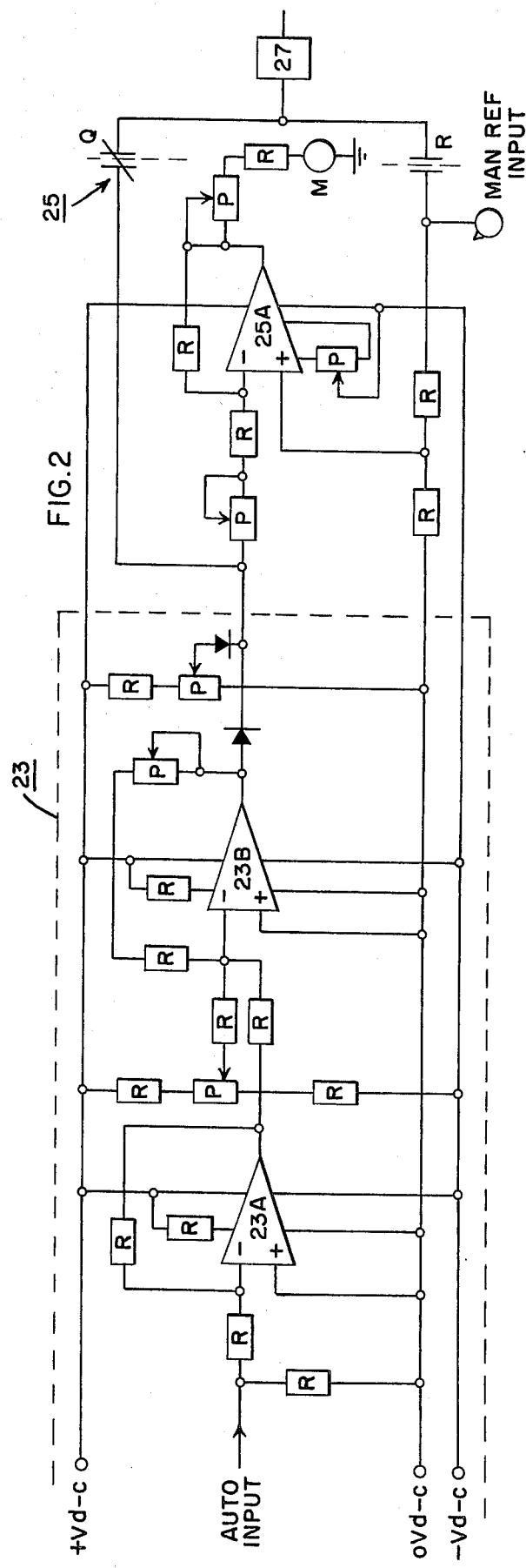
FIG. 2 is a schematic diagram of the signal converter and switching means.

Referring to FIG. 2, the automatic reference speed signal converter will be described in greater detail, as well as a means for switching from automatic to manual control and vice-versa. The automatic control signal may be a current or voltage having a positive or negative polarity. In order to make the input signal electronically compatible with standard system components, i.e., the voltage to frequency converter and phase-frequency detector, the variable reference speed signal is converted to a positive d-c voltage in the range of, for example, 0 to 10 volts positive d-c. This is provided for in the signal converter 23 which includes resistors and a pair of gain adjustable operational amplifiers 23A and 23B used as inverters for converting current to voltage. The exact circuitry of the signal converter 23 will depend upon the nature and magnitude of the input signal. The automatic input reference signal may be derived from a computer which is programmed to the particular application of the prime mover. The output voltage of the signal converter will be proportional to the input signal which represents desired prime mover speed, the range of the output signal being, for example, 0 to 10 volts d-c. The operational amplifiers may have a power supply of, for example, ±15 volts d-c and the range of the output signal is determined by bias points set by means of potentiometers.

The output voltage from the signal converter 23 is input into a high-speed stop 27 and null meter M. The path to the null meter M includes an operational amplifier 25A used as a comparator. In FIG. 2, a switch Q is closed and a switch R is open indicating that the input signal into high-speed stop 27 is the automatic signal voltage. However, it may be desirable to switch from automatic turbine control to manual turbine control. In this case, a manual reference input is adjusted to provide a manual input signal to the comparator amplifier positive input along with the automatic reference input signal to the negative terminal of the comparator amplifier. The comparator amplifier output signal is input into the null meter M. When the two comparator amplifier input signals are equal, the null meter M reads zero and switch R is closed and switch Q is opened and the input signal to the high-speed stop becomes the manual signal. The reverse of the just-described method may be practiced when switching from manual to automatic control. The apparatus and mode of operation therefore allows accurate synchronization of the manual signal to the automatic signal and vice-versa.

Figure 3A:
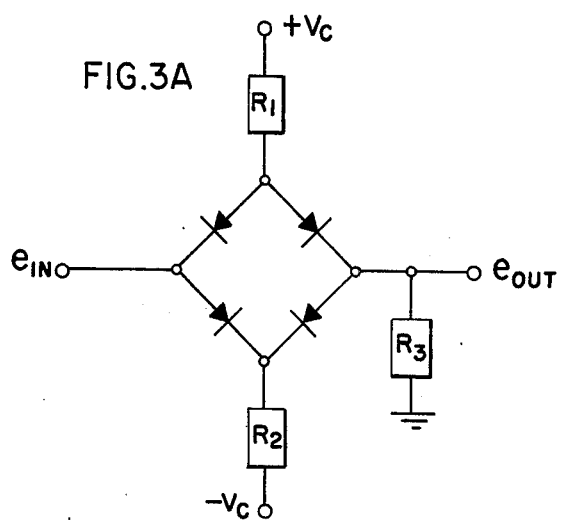
FIGS. 3A and 3B disclose respectively means providing a high-speed stop and a transfer function diagram therefor.
Figure 3B:
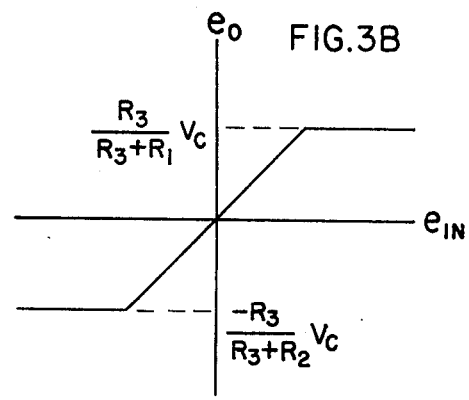

FIGS. 3A and 3B disclose respectively a circuit for a high-speed stop (FIG. 1, block 27) and a transfer function diagram therefor. The purpose of the high-speed stop is to limit the voltage output of the speed reference signal and thereby prevent an excessively high voltage from being set. FIG. 3A shows a diode bridge limiter which provides the circuitry for the high-speed stop 27 while FIG. 3B shows the transfer function therefor. The maximum output of the high-speed stop may be adjustable by inclusion of a potentiometer for resistor $R_3$ or by including a potentiometer in series between the resistor $R_3$ and ground. Moreover, a second potentiometer may be included for overspeed test adjustments. As long as the diodes are conducting, this circuitry will provide an output voltage equal to the input voltage. When one or more of the diodes ceases to conduct, the positive output voltage will be limited to a maximum level which is predetermined by the value of the voltage supply Vc and the value of the included resistors notwithstanding further increases in the input voltage level. A representative cutoff voltage in the present system may be +7 volts d-c corresponding, for example, to a turbine speed of 7000 rpm.

Figure 4:
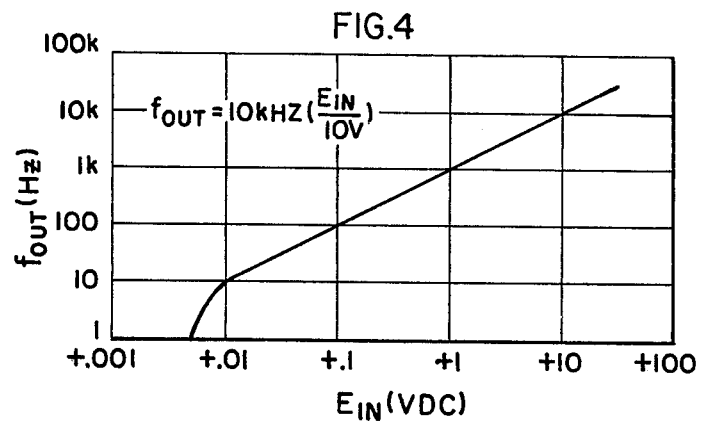
FIG. 4 is a transfer function diagram of the voltage to frequency converter.

Block 29, FIG. 1, is a voltage to frequency converter provided for converting the output d-c voltage from the high-speed stop to an output speed reference signal in the form of a digital pulse train having a frequency which is linearly proportional to the output voltage of the high-speed stop. A device for performing this function is generically known as a voltage controlled oscillator. A suitable, commercially available device to perform this function is the Model 4701 Voltage to Frequency Converter manufactured by Teledyne Philbrick of Massachusetts and described in U.S. Pat. No. 3,746,968 to Pease, issued July 17, 1973. FIG. 4 is illustrative of the transfer characteristics of the Voltage to Frequency Converter having an input range of from +0.01 volts d-c to +10 volts d-c and a linearly corresponding output range of 10 HZ to 10 KHZ.

The actual turbine speed is given by a feedback signal in the form of a digital pulse train, the frequency, of which, is proportional to the actual turbine speed. This is obtainable by a transducer 33 operatively associated with a toothed wheel rotatable with the turbine shaft. A device appropriate for this purpose is an Airpax Model 4-0001 Zero-Velocity Digital Pickup which combines Hall effect principles with solid-state circuitry to provide constant amplitude logic pulses from zero speed to very high speed. The output of the pickup depends upon the position of the gear tooth of the toothed wheel and not the velocity of the surface passing in front of the pickup. Each time a gear tooth passes in front of the pickup, the output voltage switches from 0 to a positive 5 volts d-c. After the gear tooth has passed the pickup, the pickup output voltage switches back to zero volts until the next gear tooth moves into position.

Figure 5:
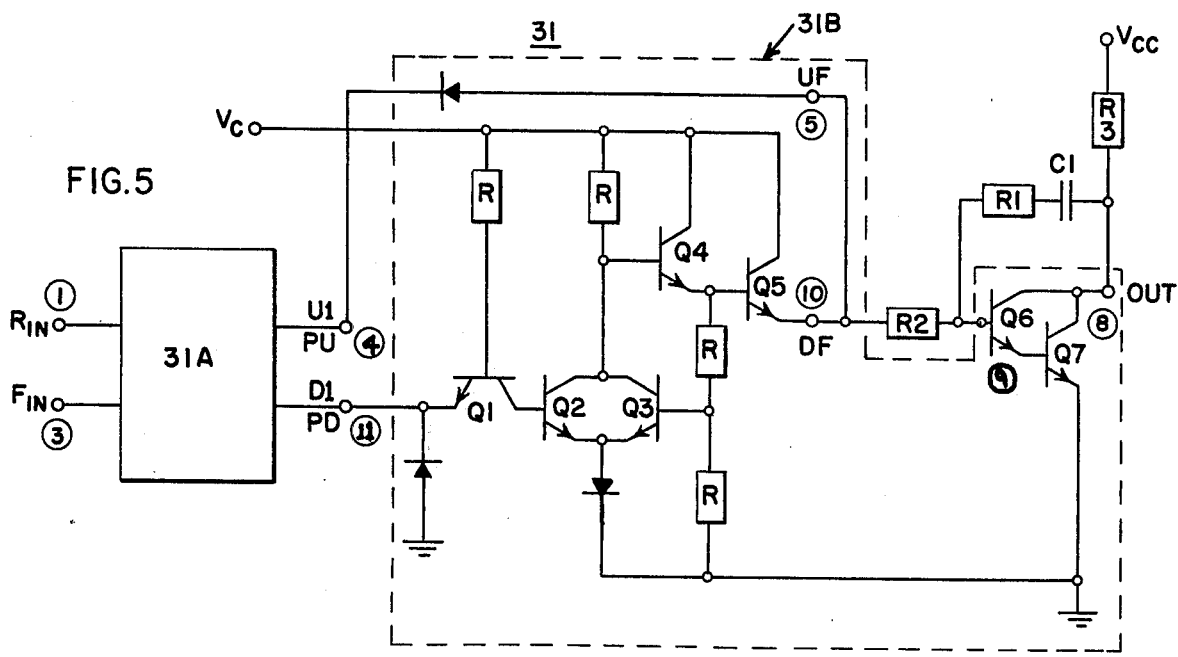
FIG. 5 is a schematic diagram of the phase-frequency detector.

The reference speed digital pulse train R and the feedback actual speed digital pulse train F are input into a phase-frequency detector 31 as shown in FIG. 5. The phase-frequency detector includes sequential logic circuitry 31A and a charge pump 31B. One suitable phase-frequency detector is commercially available from Motorola Semiconductor Products, Inc. under the designation MC 4344/MC 4044.

The operation of the phase-frequency detector is best understood with reference to FIGS. 5A, 5B and 5C. There are three possible operating conditions, two of which are shown in FIGS. 5A and 5B. The omitted case is where there is no phase difference between the reference input R and the feedback input F in which case U1 and D1 terminal outputs are both high and the phase detector output at DF is plus 1.5 volts d-c as shown in FIG. 5C for zero phase difference.

In FIG. 5A, the feedback input F lags the reference input R at a phase difference $\phi$ of minus $\pi/2$ radians. The phase difference $\phi$ is measured by the relative position difference, in radians, between the negative going transitions of the reference signal R and the feedback signal F. The U1 terminal response is pulsed while the D1 terminal response remains high. Referring back to FIG. 5, when terminal D1 is high, transistor Q1 conducts in the reverse direction thereby supplying a base current to transistor Q2. While transistor Q2 is conducting, transistor Q4 is prevented from supplying a base drive to transistor Q5; with transistor Q5 cutoff and UF low there is no base current for transistor Q6 and the voltage at the collector of transistor Q7 moves up, resulting in a pump-up signal. According to FIG. 5C, the output voltage at DF for a lag of minus $\pi/2$ radians is approximately 1.3 volts or 0.2 volts below the "in phase" DF output of 1.5 volts. Because of the Q6, Q7 circuit arrangement, as the voltage at DF decreases below the zero phase difference voltage of plus 1.5 volts there is a voltage increase at point 8, the output of the phase-frequency detector. The increase in output voltage at point 8 ultimately causes the turbine inlet valve to further open thereby increasing turbine speed to correct the phase lag.

In FIG. 5B, the feedback input F leads the reference input R at a phase difference $\phi$ of pulse $\pi/2$ radians. In this case, the U1 terminal output is high while the D1 terminal is pulsed. When D1 is low and U1 is high, transistor Q1 will be conducting in the normal direction, while transistor Q2 will be off. Transistor Q5 will supply current to transistor Q6. This will tend to lower the voltage at the collector of transistor Q7, resulting in a voltage drop or "pump down" signal. According to FIG. 5C, the output voltage at DF for a phase difference of pulse $\pi/2$ radians is approximately 1.7 volts or 0.2 volts above the in-phase output of 1.5 volts. As the voltage at DF increases above the zero phase difference voltage of plus 1.5 volts there is decrease in voltage at point 8. The decrease in voltage at point 8 ultimately causes the turbine inlet valve to further close thereby decreasing turbine speed to correct the phase lead.

FIG. 6 shows the module phase-frequency detector 31 and summing junction $\Sigma$ interconnected by a stabilizing circuiting 35. The stabilizing circuit includes appropriate lead-lag circuitry comprising series connected operational amplifiers each having suitable RC feedback loops, the component values of which depend upon system requirements for stable operation.

Referring back to FIG. 1, a summing junction $\Sigma$ receives the positive output voltage from block 35 (stablizing circuit) and negative voltages developed by feedback transducers (LVDT's) respectively from the hydraulic amplifier 17 and valve operator 15 indicating the latest valve position. The resultant voltage is then input into amplifier 21. The output of amplifier 21 positions servo valve 19, hydraulic amplifier 17 and valve operator 15 to provide a new inlet valve 13 position.

From the foregoing, it should be apparent that the present invention is directed to a prime mover speed control system based on a phase comparison or position difference between a reference pulse train and a feedback pulse train, the latter representing actual turbine speed. This is distinguishable from prior art prime mover speed control systems wherein the speed error is derived from a frequency comparison or relative speed difference between a reference signal and a feedback signal. In the present invention, a valve position corrective signal is applied prior to the occurrence of an actual speed difference and hence the present invention is more stable, more precise and more responsive than prior art systems. Moreover, the range of speed control is increased since the present invention may operate at very low speeds or very high speeds since system "undershoot" and "overshoot" is relatively non-existent.

While there is shown what is considered, at present, to be the preferred embodiment of the invention, it is, of course, understood that various other modifications may be made therein. It is intended to claim all such modifications as fall within the true spirit and scope of the invention.

What is claimed is:

1. A speed control system for a fluid-driven prime mover, the prime mover having an inlet valve means controlling the fluid flow into the prime mover, the inlet valve means being positioned in accordance with an output signal from the control system, the control system comprising:

means providing a variable first elecrical signal comprising a digital pulse train having a frquency proportional to the desired speed of the prime mover;

means providing a second electrical signal comprising a digital pulse train having a frequency proportional to the actual speed of the prime mover;

means comparing the first and second electrical signals to derive a phase error signal based on the relative position between like transitions of the first and second digital pulse trains; said comparing means including a phase-frequency detector receiving the first and second electrical signals and providing a first output signal indicative of lead and a second output signal indicative of lag; and, means converting the outputs of said phase-frequency detector into a d-c voltage having a magnitude proportional to the phase difference and indicative to lead-lag which is applied to the inlet valve means.

2. The control system recited in claim 1 wherein the phase error signal is based on the relative position difference between high to low transitions of the respective first and second digital phase trains.

3. The control system recited in claim 1 wherein the means for providing the variable first electrical signal include:

signal converter means including first and second gain adjustable operational amplifiers for providing a positive d-c voltage output;

voltage to frequency converter means receiving the output voltage from the signal converter means and providing an output comprising the first electrical signal digital pulse train having a frequency proportional to the input d-c voltage.

4. The control system recited in claim 3 wherein there is a high-speed stop means for limiting the input voltage into the voltage to frequency converter means to a positive maximum input voltage, said high-speed stop means electrically interconnecting the signal converter means and the voltage to frequency converter means.

5. The control system recited in claim 3 wherein the variable first electrical signal may include a manual input and an automatic input, the control system further including switching means for switching from manual to automatic input and vice versa, the switching means including:

the automatic input having a first parallel branch connected through a first switch to the voltage to frequency converter means and a second parallel branch providing a first input into a signal comparator means;

the manual signal input having a first parallel branch connected through a second switch to the voltage to frequency converter means and a second parallel branch providing a second input into the signal comparator means; and, a meter receiving the output signal from the comparator means to determine when the first and second comparator inputs are equal and only one of the switches is closed depending on the desired manual or automatic mode of operation.

6. The control system recited in claim 1 wherein the means providing the second electrical signal include:

a toothed wheel rotatable with the prime mover shaft; and, pickup means adjacent the toothed wheel whereby a pulsed electrical signal is generated when a tooth passes the pickup.

7. A control system for a fluid-driven prime mover, the prime mover having inlet valve means controlling the fluid flow into the prime mover, the inlet valve means actuated according to an output signal from the control system, the control system including:

means providing a variable first electrical signal comprising a digital pulse train having a frequency proportional to the desired speed of the prime mover;

means providing a second electrical signal comprising a digital pulse train having a frequency proportional to the actual speed of the prime mover;

means comparing the first and second electrical signals to derive a phase error signal based on the relative position difference between high to low transitions of the respective first and second digital pulse trains, said phase error signal being developed although the first and second electrical signals may be at the same frequency and the phase error signal being a positive d-c voltage level;

means sensing the position of the inlet valve means and providing a negative feedback voltage; and, the phase error signal and the inlet valve position signal being combined at a summing junction to develop a new valve position signal even though no actual speed change has occurred in the prime mover.

8. The speed control system recited in claim 7 wherein the first electrical signal is variable in the range of from substantially zero-speed to any desired prime mover speed.

* * * * *